United States Patent [19]

Dorian et al.

[11] 4,223,214
[45] Sep. 16, 1980

[54] SOLAR TRACKING DEVICE

[75] Inventors: Mark E. Dorian, San Diego; David H. Nelson, Arroyo Grande, both of Calif.

[73] Assignee: American Solar Systems, Inc., Arroyo Grande, Calif.

[21] Appl. No.: 867,984

[22] Filed: Jan. 9, 1978

[51] Int. Cl.² .............................................. G01J 1/20
[52] U.S. Cl. .................................. 250/203 R; 250/209
[58] Field of Search ....................... 250/203, 208, 209; 126/270, 271; 356/141, 152

[56] References Cited

U.S. PATENT DOCUMENTS

| | | | |
|---|---|---|---|
| 3,619,618 | 11/1971 | Thorn et al. | 250/209 |
| 4,082,947 | 4/1978 | Haywood et al. | 250/208 |
| 4,108,154 | 8/1978 | Nelson | 250/203 R |
| 4,146,785 | 3/1979 | Neale | 250/209 |
| 4,150,285 | 4/1979 | Brienza et al. | 250/203 R |
| 4,151,408 | 4/1979 | Brown et al. | 356/152 |

*Primary Examiner*—David C. Nelms
*Attorney, Agent, or Firm*—Fulwider, Patton, Rieber, Lee & Utecht

[57] ABSTRACT

An improved solar tracking arrangement is provided for directing a solar energy collector to face the sun. An electrical control mechanism is provided to detect misalignment of the collector as the sun traverses in relative movement across the sky. When the misalignment exceeds an adjustable limit of tolerance, the tracking system moves the collector to an orientation slightly in advance of the current position of the sun by an amount equal to the limit of tolerance. A threshold light level is required to activate the tracking system, and differential photosensors are employed, the composite signals of which compensate for variations in ambient light level so that the amount of surrounding illumination of the environment does not effect the preset limit of tolerance. The tracking system includes east and west limit switches, which reorient the collector to an eastward facing direction at the end of each day. A high temperature cut off is provided to direct the collector away from the sun when the operating temperature of the collector exceeds a predetermined limit of safety. For self-contained operation, photovoltaic cells are mounted on the collector to provide electricity for the tracking system.

15 Claims, 5 Drawing Figures

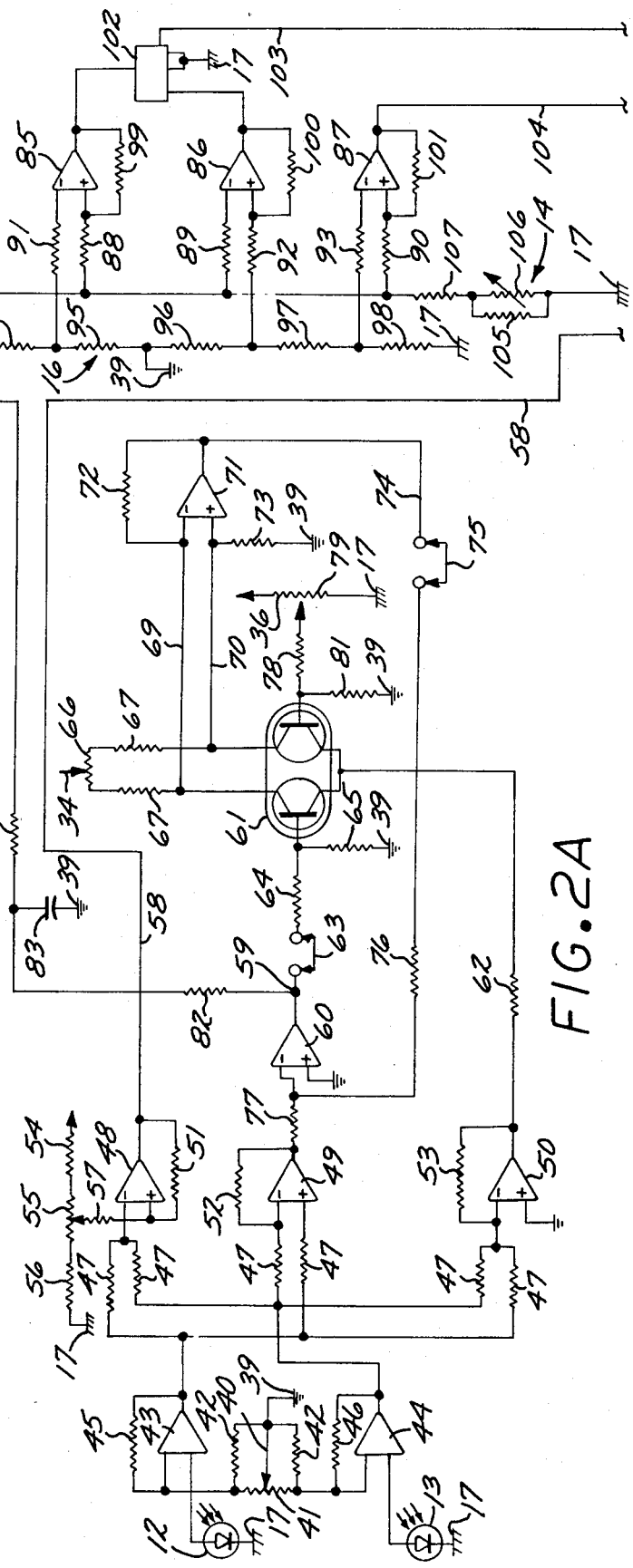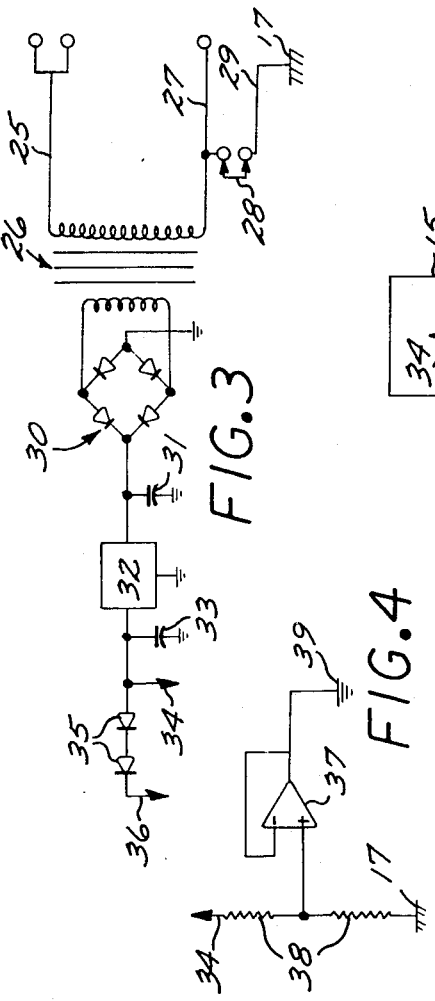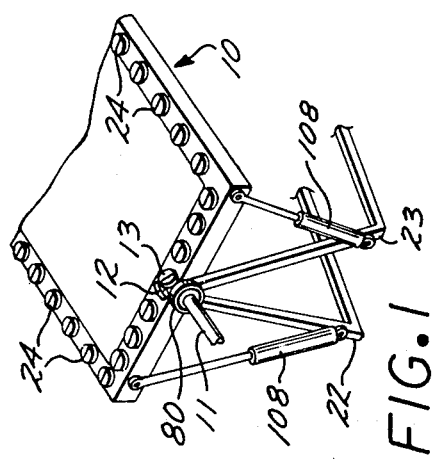

SOLAR TRACKING DEVICE

FIELD OF THE INVENTION

The present invention relates to solar energy collection devices.

BACKGROUND OF THE INVENTION

The desirability of facing solar energy collectors and concentrators directly at the sun to receive direct solar radiation therefrom, or alternatively to follow the relative motion of the sun across the earth's sky with a reflector in order to direct light from the sun onto a solar energy collector or concentrator is well known. A significant problem has existed in arriving at a satisfactory drive system for such tracking operations, however. Tracking systems are necessarily operated by some motion producing means, and historically the energy required to effectuate the requisite motion of the tracking system has represented a very substantial portion of the solar energy collected in the system. Consequently, a principal function of conventional solar collectors and concentrators employing such tracking mechanisms has been to maintain their own operation, with the result being a minimal net output of energy. For this reason many commercially available solar energy collection systems have abandoned solar tracking as yielding insufficient benefits to compensate for the energy consumed in their own operation. Consequently, such conventional solar energy collection devices have been operated at substantially less than the efficiency of which they are capable.

Other solar energy collectors, especially those of the concentrator variety, have accepted the energy drain which results from the use of those solar tracking systems. Because of the extreme loss in efficiency which results from misalignment of concentrators, such as parabolic reflectors employing a solar energy collection conduit located at the parabolic focus, solar energy concentration systems have continued to employ tracking systems, despite the power consumed in their operation.

In the aforementioned U.S. patent application Ser. No. 744,290, a tracking system was described which operated upon an entirely different and unique principle and which requires far less power consumption than other conventional solar tracking systems. The tracking device described in the foregoing patent application discloses a solar tracking system in which a counterweight or other gravitational influence is employed to aid the required movement of the collector to maintain an orientation directed at the sun. By balancing the collectors in this manner, tracking systems need only reposition a small counterweight and overcome static enertia of a collector rather than move the relatively large mass of the collector unaided. However, even though representing a substantial step forward in the art, the tracking system disclosed in U.S. Patent Application Ser. No. 744,290 still fails to deal with certain problems in positioning solar collectors using a tracking system.

Heretofore, tracking devices for following the course of relative movement of the sun across a field of view have attempted to maintain a solar energy receiving panel, plate or trough in precise alignment relative to the sun. However, in some solar collection systems, such precision of alignment is not warranted by the energy consumed in the process. This is especially true of flat plate or panel collectors which currently represent the most commercially significant form of solar energy collection devices. The orientation of a flat plate collector suffers very little from misalignment over a significant arc, up to 30° in some systems. The efficiency of energy collection in most flat plate collectors varies only slightly between the hours of 10 AM and 2 PM when the collectors are positioned immobile facing the equator and oriented in a north south direction at an inclination to face the sun directly as it passes overhead.

It is an object of the present invention to provide a tracking system for solar energy collectors which will reorient the collector only when misalignment relative to the sun exceeds a predetermined adjustable limit of tolerance. The allowable levels of tolerance may be as much as 30° with some flat plate tracking systems, or as little as 0.1° when used with some types of solar energy concentrators. Normally, most adjustments of the tolerance limit will be in the range of 15° to 2°. Because of its flexiblity, the invention finds applicability for use with virtually any type of solar energy collector, since all collectors benefit from proper orientation toward the sun.

A further feature of the invention is that the realignment adjustments made are such as to minimize the number of times that the collector requires realignment during a solar day. Instead of merely reorienting the solar radiation receiving portion of the collector to a currently optimum position, the tracking system of the present invention instead directs the collector to a position slightly in advance of the current position of the sun. The amount by which the tracking mechanism "leads" the sun at the time of its reorientation is equal to the limit of tolerance prescribed. Thus, immediately following reorientation of the collector, the relative movement of the sun tends to bring the sun and the collector toward an optimum position of alignment. Once the sun has approached and reached the optimum position, it thereafter, continues in its relative movement and recedes from the optimum position of alignment until it is at a point of misalignment which is equal to the prescribed limit of tolerance in the direction of relative progression across the sky. By this time, the situation is reversed and the sun then "leads" the collector. This condition signals the requirement for a subsequent adjustment of the tracking mechanism so that the collector is again positioned to "lead" the sun.

Preferably, the tracking mechanism is operable between a pair of limit switches, one associated with an east facing orientation of the collector an the other associated with a west facing orientation. Realignment of the collector by the tracking mechanism continues throughout the course of a day until the west limit switch is reached. At this time, the sun is low enough on the horizon that further reorientation of the tracking mechanism is not warranted by the relatively small increase in efficiency that would result as contrasted with the power expended in moving the collector. Instead, actuation of the limit switch either immediately or upon the occurence of some other signal, such as the reduction of an ambient light level of the surrounding environment below a prescribed threshold, will trigger a return of the collector to an east facing position. In arriving at the east facing position, the east limit switch deactivates the tracking mechanism to prevent further movement until a threshold illumination level again prevails. This will not normally occur until the next morning, so that the tracking mechanism expends no power in reorienting the collector in darkness or upon extremely cloudy days.

The threshold light detection mechanism has uses other than just inhibiting reorientation of the collector from an east facing position on particularly cloudy days when the solar energy which could be collected does not warrant the expenditure of power in reorienting the collector. The threshold detector prevents a power expenditure in reorienting the collector during the course of cloudy periods during a day or when for any other reason a satisfactory illumination level is not achieved. This might occur by reason of coverage of the collector with dust, sand or snow.

A further feature of the invention is the manner of generation of the signals used to effectuate reorientation. Differential photosensors are employed in opposition to each other. Each photosensor is positioned for greater responsiveness to light impinging upon the collector from opposite directions at angles of incidence departing from 90°. The photosensitive detectors provide separate outputs which are combined in opposition to provide a differential output signal. Moreover, the sum of the two outputs is also utilized so that the ratio between the difference and the sum of the two detector outputs may be derived. This ratio is employed as the controlling signal in effectuating reorientation of the collector. In so doing, the system compensates for different levels of ambient light, and thus maintains the particular tolerance limit established as being the most desirable. In the absence of control in this manner, the tracking mechanism would respond to extremely bright sunlit days by decreasing the allowable tolerance limit. Conversely, on somewhat cloudy days in which the ambient light level of the surrounding environment is still sufficient to achieve the requisite threshold, operation of the tracking system without compensating for ambient light level would result in an increase in the tolerance level. Either such variation is undesirable as such variations in tolerance limits do not correspond to relative efficiencies of alignment under identical ambient light conditions, but rather are correlated only to the absolute levels of energy conversion.

A further object of the invention is to provide a tracking system with a safety mechanism which can respond to excessive operating temperatures. Typically, solar collectors employ a heat collection fluid circulating through a solar energy receiving station. When this fluid reaches a temperature above a predetermined safe limit, it is desirable to effectuate a temperature reduction. This is achieved in the present invention by actuating the tracking mechanism to direct the collector away from an orientation facing the sun to a position in which it does not face the sun. This allows the heat collection fluid to cool and thus avoid adverse effects to the solar collection equipment. Unsafe temperatures sometimes result when there is a blockage or leak in the solar collection fluid line. In such circumstances a "stall condition" exists in which no fluid is passing through the collector. Continued operation of the collector and of the pump which normally drives fluid through the collector can result in considerable damage to the equipment.

A further object of one embodiment of the invention is to provide an entirely self-contained tracking system for rotating a solar energy collector to face the sun by means of an electrically operated drive system in which no external electrical power source is provided. This is achieved by positioning photovoltaic cells on the collector. The electrical output of these cells may be utilized to operate the tracking system. The energy output of voltaic cells provides sufficient power for this purpose when the tracking system is constructed to draw a minimum of power. Accordingly, the provision of photovoltaic cells as a source of power for the tracking system, and indeed as a source of power to pump fluids circulating through one or more collectors, has particular application in connection with the tracking arrangement depicted in the aforesaid U.S. Patent Application Ser. No. 744,290 and in U.S. Patent Application Ser. No. 789,424, filed Apr. 21, 1977.

DESCRIPTION OF THE DRAWINGS

FIG. 1 is a perspective view of a portion of a solar collector including photovoltaic cells for powering a tracking system according to the present invention.

FIGS. 2A and 2B together depict the tracking control system according to the present invention.

FIG. 3 depicts a power connection to a conventional alternating current line, as an alternative embodiment to that of FIG. 1;

FIG. 4 depicts a circuit for forming a virtual ground useful in conjunction with the tracking control sytem of FIGS. 2A and 2B.

DESCRIPTION OF THE EMBODIMENT

Figure 2B:
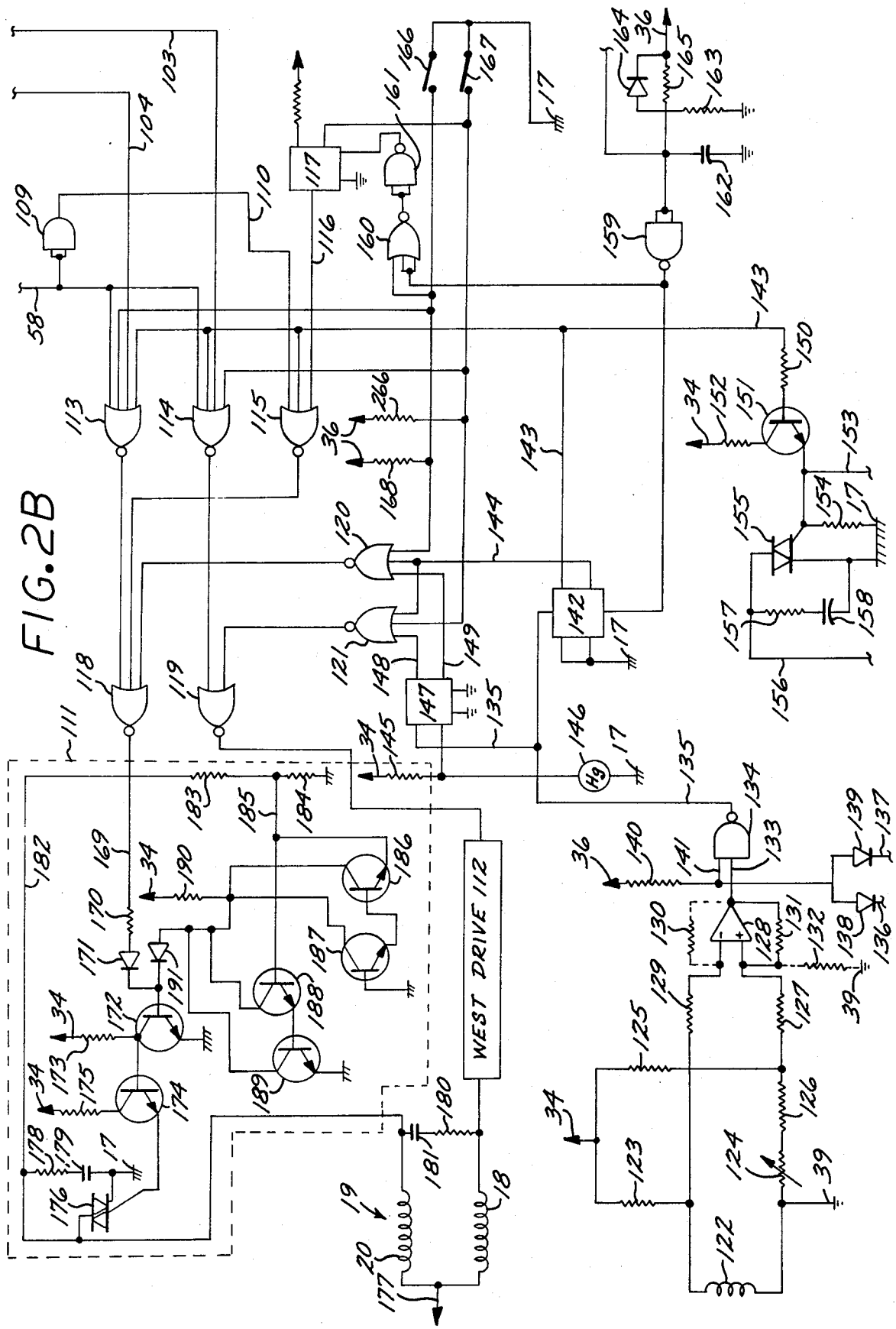

FIG. 1 depicts a flat plate solar energy collecting panel 10 oriented for rotation about an axle 11 generally aligned in a north-south direction, whereby the collector 10 can be rotated for orientation towards the sun. A pair of photosensitive diodes 12 and 13 are provided and are interconnected to detect misalignment of the solar energy collector 10 relative to the sun beyond a preselected limit of tolerance as established by the variable rheostat and shunt mechanism 14. The photosensitive diodes 12 and 13 are connected in opposition so that the relative magnitude or an error signal on line 15 with respect to a control signal provided by a resistor string 16 determines the direction of rotation of the collector 10 to effectuate reorientation. The error signal on line 15 is processed to allow the provision of a drive signal to a reversible alternating current motor 19 for the tracking system on either winding 20 or winding 18 in FIG. 2B to respectively position the collector 10 to an east facing or west facing direction.

The axle 11 is supported within annular bearing races, such as the bearing race 80 visible in FIG. 1, mounted uptop upright diverging legs 22 and 23 which rest upon the surface of the earth. The axle 11 is aligned in a north-south direction. Normally, the end of the axle 11 remote from the equator will be elevated to the extent appropriate to the latitude at which the collector 10 is located. That is, when located near one of the polar circles, the end of the axle 11 remote from the equator will be elevated to a much greater extent as compared with collectors located near the equator. A pair of shock absorbers 108 are connected by clamps to the legs 22 and 23 and to a longitudinally extending pin offset from the axle 11. The shock absorbers 108 serve to dampen movement of the collector 10 to inhibit the spurous generation of signals from the photosensors 12 and 13 which might otherwise result from gusts of wind rocking the collector 10.

The flat plate collector 10 is constructed with a generally rectangular elongated panel within which blackened copper tubing is arranged in serpentine fashion to carry a solar energy collection fluid. Photovoltaic cells 24, sometimes termed solar chips, are arranged about the perimeter of the upper surface of the flat plate collector 10. The photovoltaic cells 24 may be connected in series or in parallel, or in a series-parallel combination, to provide a source of direct electrical current to power the control system of FIGS. 2A and 2B. The preferred embodiment of the tracking control system depicted in FIGS. 2A and 2B requires a stable direct current voltage source, which may, for example, provide voltage supplies of 6.8 volts and 8 volts. The position of the photovoltaic cells 24 about the border of the collector 10 is quite advantageous in that this perimeter area is normally not utilized to receive solar radiation on conventional flat plate collectors. Rather, it has heretofore been used only to accomodate insulation and/or structural purposes. The photovoltiac cells 24 may be of any conventional type and may typically be formed of doped selenium. The electricity developed from the photovoltaic cells 24 may be used to power other portions of the collector system in addition to the tracking control system of FIGS. 2A and 2B. For example, the cells 24 can be used to power a pump which forces the solar energy collection fluid through the serpentine tubing in the collector 10.

The utilization of photovoltiac cells 24 as a source of electrical power is particularly advantageous where the collector 10 is to be used in remote or undeveloped areas where electricity is not availabe. Such conditions frequently exist throughout desert areas, which are prime areas of application of solar energy collection devices. The feature of self-containment of the solar collector 10 allows a tracking system to be employed in areas where this has not been possible before. In other areas where electricity is available economically, conventional alternating line current may be utilized to power the tracking system control. A conventional transformer arrangement is depicted in FIG. 3 in which 117 volt alternating current, operated at 50 to 60 cycles plus or minus 25%, is provided on a hot lead 25 to the primary of a transformer 26. The other side of the primary winding of the transformer 26 may be connected to either a neutral line 27 or, if desired, through a jumper 28 to a ground line 29. The secondary of the transformer is connected to a full wave rectifying bridge 30. The output of bridge 30 is connected across a filtering capacitor 31 to a conventional 8 volt 100 miliamp regulator 32. The output of regulator 32 is also connected to another filtering capacitor 33. A voltage tap at 34 provides a stable eight volt D.C. supply for the operational amplifiers of FIGS. 2A and 2B. Dropping diodes 35 are provided to produce a positive 6.8 volt supply at 36 for operation of the CMOS components of the control system of FIGS. 2A and 2B.

Voltage may either be provided from the photovoltaic cells depicted in FIG. 1 or from a conventional line current transformer and rectifier voltage conversion arrangement utilized as depicted in FIG. 3. In either type of power supply it is useful to develop a virtual ground for use throughout the control system of FIGS. 2A and 2B. The virtual ground is developed by an operational amplifier 37, depicted in FIG. 4, and connected with a positive input between two equal resistors 38 between the eight volt source 34 and actual ground at 17. The virtual ground at 39 allows the use of operational amplifiers to provide signals of opposite polarity in response to outputs of the photosensitive diodes 12 and 13.

The photosensitive diodes 12 and 13 depicted in FIG. 2A are positioned at an angle to each other in back to back relationship as illustrated in FIG. 1. This arrangement causes each of the photosensitive diodes 12 and 13 to be more responsive to light impinging upon the collector 10 from opposite directions. That is, when the collector 10 is aligned to directly face the sun so that solar radiation is received normal to the plane of the collector 10, the outputs of the photosensitive diodes 12 and 13 are equal. If the collector 10 is misaligned so that the rays of the sun strike the collector 10 at an angle of incidence departing from 90°, the output of one of the photosensitive diodes 12 or 13 will be significantly greater than the other. If inequality exists between the outputs of photosensitive diodes 12 and 13, compensation may be provided by adjusting the wiper arm 40 along a trimming resistor 41 between two parallel resistors 42 which are connected to virtual ground at 39. Trimming in this manner is normally performed at the time of installation of the collector 10 and incident to periodic testing to compensate for unequal aging of components of the photosensors 12 and 13.

The outputs of the photosensitive diodes 12 and 13 are each connected to the positive input terminal of separate operational amplifiers 43 and 44 connected with negative feedback resistors 45 and 46 respectively.

The outputs of operational amplifiers 43 and 44 are connected through resistors 47 to the inputs of operational amplifiers 48, 49 and 50 as indicated in FIGS. 2A. The output of amplifier 48 is connected with positive feedback through a resistor 51, while the outputs of amplifiers 49 and 50 are provided with negative feedback through resistors 52 and 53 respectively. The positive input terminal of operational amplifier 48 is connected to develop an adjustable positive voltage from the central resistor 55 of a dropping resistor string 54, 55 and 56 from the eight volt supply 34 through a resistor 57 in order to provide an absolute threshold setting for trim. The operational amplifier 48 thereby serves as a threshold enabling device and provides an inhibiting output on line 58 unless the sum of the outputs of photosensitive diodes 12 and 13 exceed the predetermined threshold level established by the wiper arm on the resistor 55. In this way, a minimum ambient light level requirement for the surrounding environment is established before a signal will be provided to the motor 19.

The outputs of operational amplifiers 49 and 50 respectively represent the difference between the outputs of photosensitive diodes 12 and 13 and the sum thereof. The outputs of operational amplifiers 49 and 50 are passed to a dividing circuit in order to produce a signal at junction 59 which represents the difference of the outputs of photosensitive diodes 12 and 13 divided by their sum. Analog circuitry for achieving such a signal includes an operational amplifier 60 connected to one base of a transistor in a transistor array 61 which includes two isolated transistors in a Darlington connected transistor pair. The two emitters of the transistors in the transistor array 61 are coupled to the output of the operational amplifier 50 through a resistor 62. The output of operational amplifier 50 is connected through normally closed test points 63 and through a resistor 64 to one of the transistor bases with a tap to virtual ground through a resistor 65. Collector voltage to the transistors in the array 61 is provided from the eight volt supply on line 34. The transistors may be balanced by adjustment of a wiper from the voltage supply 34 along a resistor 66 which includes parallel connections through a pair of resistors 67 to the opposing collectors of the transistors in the transistor array 61. A wiper arm from resistor 78 is connected to a dropping resistor 79 which is connected to actual ground at 17. The signal from resistor 78 is connected across a shunting resistor 81 which is connected to virtual ground at 39 to the other base of the transistor pair 61. The adjustment of the wiper from the resistor 78 along the resistor 79 matches the two transistors in the transistor array 61 and adjustment of the wiper arm carrying the eight volt supply on line 34 across the resistor 66 effectuates balancing of the division circuit.

The result of connecting the base of one of the transistors in the array 61 to the output of operational amplifier 60 is to provide a differential signal on lines 69 and 70 mulitplied by the amplified sum of the photosensitive diodes 12 and 13 as provided by the operational amplifier 50. This differential output on lines 69 and 70 is fed to an inverting function operational amplfier 71 having a feedback resistor 72 to the input on line 69 and having a resistor 73 connected to virtual ground from line 70. The output of operational amplifier 71 represents an inversion of the multiplication function performed in the transistor array 61. This signal on line 74 is passed across normally closed test points 75 and resistor 76. The resulting signal is returned to the negative input of operational amplifier 60, where it is combined with the differential output from operational amplifier 49 as reduced by the series connected resistor 77. The voltage at junction 59 thereby represents the quantity $$S_1 - S_2 / S_1 + S_2$$

where $S_1$ is the output of photosenstive diode 12 and $S_2$ is the output of photosensitive diode 13. Because the signal at junction 59 is in the form of a ratio of the difference between the photosensor outputs divided by the sum of the photosensor outputs, variations in ambient light level do not effect the error signal 15. This prevents inordinately large error signals from being produced where the ambient light level is high and excessive low error signals from being generated at low levels of ambient light. As a result, the misalignment tolerance level, as established by the rheostat and shunt mechanism 14, is insensitive to variations in ambient light level.

The output of operational amplifier 60 is passed across a filtering network including a resistor 82 and a capacitor 83 connected to virtual ground. This network tends to filter out 60 cycle noise in those systems in which the direct current power supply is derived from conventional alternating line current, as with the embodiment of FIG. 3. The value of the capacitor 83 may be varied and can be increased to control the time response of the system. The error signal from the summing junction 59 is passed through a resistor 84 to line 15 where the directional drive signals for the motor 19 are developed.

The directional drive signals are developed at the outputs of operational amplifiers 85,86 and 87. Each of these amplifiers is connected to the error signal line 15 through resistors 88,89 and 90 respectively. The opposing inputs to the operational amplifiers 85, 86 and 87 are provided through resistors 91,92 and 93 from a resistor string 16 including a series of dropping resistors 94,95 96,97 and 98 which are connected between the eight volt supply 34 and actual ground 17. A connection to virtual ground at 39 exists between resistors 95 and 96. Positive feedback loops containing resistors 99,100 and 101 are provided for the operational amplifiers 85,86, and 87 respectively. The resistors 99 and 100 are provided to correct for hysteresis in the system.

The outputs of operational amplfiers 85 and 86 are respectively connected to the set and reset leads of a C-D flip flop circuit 102. The C and D leads of flip flop 102 are tied together to actual ground at 17. The $\bar{Q}$ output at 103 is the operative signal derived from the flip flop 102.

The polarity of the error signal on line 15 is determined by the relationship between the inputs to operational amplifier 49, which in turn are derived from the photodetectors 12 and 13. If the error signal on line 15 provides an input through the resistor 88 which is more positive than the control input through resistor 91 from the resistor connection to the resistor string between resistors 94 and 95, than the output of operational amplifier 85 goes positive to set the flip flop 102. This removes an inhibiting signal at the $\bar{Q}$ output of flip flop 102 on line 103, indicating that there is an imbalance between the photodetectors 12 and 13 and that the output of photodetector 12 exceeds that of photodetector 13 as an actuating signal may be provided to the motor 19 in FIG. 2B. Conversely, if the error signal 15 acting through the resistor 89 becomes negative with respect to the output from resistor 92 derived from virtual ground 39 through resistor 96, the operational amplifier 86 will be actuated to reset the flip flop 102. This reinstates the inhibiting signal on line 103.

One further feature of the circuitry of the tracking system is the provision of a system for overshoot detection which is sensitive to the movement of the collector 10 in a westward facing direction beyond a position of realignment. When such a situation occurs, the error signal on line 15 will act through the resistor 90 to actuate the operational amplifier 87 and remove a correction inhibiting signal on line 104. The removal of the correction inhibiting signal from line 104 allows a drive signal to be generated to reverse the direction of the motor 19. The resistor 101 in the positive feedback loop at operational amplifier 87 is set to correct for hystersis and to determine how far back the motor 19 should be allowed to move.

The tracking system of FIGS. 2A and 2B includes a system of adjusting the tolerance for misalignment. This adjustment is provided in the form of a rheostat and shunt mechanism 14 which includes an adjustable trimming resistor 106 and a fixed resistor 105. The adjustment of trimming resistor 106 controls the allowable angle of deviation of incidence of the sun's rays from perpendicular impingement upon the collector 10 before realignment is initiated. In some systems, such as the flat plate collector 10 depicted in FIG. 1, a relatively large tolerance is desirable to prevent excessive power drain for effectuating marginally productive correction. In such a system, a shunt resistor 105 is provided to decrease the effect of the trimming resistor 106 as the error signal operates through it and through the resistor 107. In other types of collectors, such as parabolic reflectors, a much smaller tolerance is normally employed. Accordingly, the shunt resistor 105 would normally be removed when the tracking system is utilized with such systems to respond to tolerances of the order of $\frac{1}{4}°$ to 2°.

The output of operational amplifier 48 acting through line 58 is a signal for inhibiting operation of the motor 19. This signal, utilized both as derived at the output of operational amplifier 48 and in its inverted form at 110 at the output of an inverter 109 connected to line 58 in FIG. 2B, is combined with signals on lines 103, 104 and 116 in an inhibiting network. The outputs of the inhibiting network provide signals to an eastward driving network 111 and a westward driving network 112. The eastward driving network 111 is depicted in detail in FIG. 2B while the westward driving network 112 is only generally indicated. Since the circuit components of networks 111 and 112 are the same, only those of eastward driving network 111 are illustrated in detail.

Three NOR gates 113, 114 and 115 are provided to receive the signals on lines 58, 103, 104, and 110 and a $\bar{Q}$ output 116 from a C-D flip flop 117. Depending upon the particular input lines which are active, various of the outputs of the NOR gates 113, 114 and 115 will be active. If none of the inputs to one of these NOR gates is high, the output thereof will be high which, in the absence of an alarm condition, will result in a low input to the associated driving network 111 or 112, which is the condition necessary to drive the motor 19. The NOR gates 113, 114 are connected in series with NOR gate 118 and NOR gate 115 is connected in series with NOR gate 119. NOR gates 118 and 119 also receive alternative inputs from NOR gates 120 and 121 respectively. The NOR gates 120 and 121 are associated with particular override conditions which are connected to dominate outputs resulting from any signals received on lines 58, 103, 104, 110 and 116.

One alarm condition which provides actuating inputs through the NOR gates 120 and 121 is a condition in which the temperature of the collector 10 is abnormally high. A thermistor 122 is connected to the collector 10 to measure the temperature of the circulating solar energy collection fluid which flows therein. The leads of the thermistor 122 are connected to virtual ground at 39 and to the positive eight volt supply 34 through a resistor 123. A variable resistor 124 is provided to adjust the output signal derived from the thermistor 122 and so allow the maximum temperature limit to be adjusted. Typically, the resistor 124 is adjusted so that the operating temperature of the fluid circulating in the collector 10 is not allowed to exceed 450° F. A connection from the positive eight volt supply 34 through resistors 125 and 126 connects the variable resistor 124 to virtual ground 39 and so form a bridge network with the thermister 122 in one leg and with the variable resistor 124 in the other.

The voltage at the output of resistor 125 is connected to a resistor 127, the output of which is connected to one input to an amplifier 128. The other input to amplifier 128 is from one end of thermister 122 through a resistor 129. Feedback resistors 130 and 131 are provided to the inputs of the amplifier 128. Resistors 127 and 131 are tied together and connected through a resistor 132 to virtual ground at 39.

The operational amplifier 128 is connected so that as temperature rises in the solar energy collection fluid, as signaled by the thermister 122, the dominance of the voltage signal at the output of resistor 125 decreases, and the gain of amplifier 128 falls. When the output of amplifier 128 falls below a predetermined level, as determined by the adjustment of resistor 124, the output 133 from amplifier 128 drops to an alarm level to activate Schmitt trigger 134. The output at 135 of Schmitt trigger 134 is high if the input thereto on line 133 is low. A high output on line 135 signals an alarm condition.

The circuit depicted in FIG. 2B is constructed to allow alternative alarm conditions to be connected to the motor driving networks 111 and 112. For example, grounding at outputs of rectifying diodes 138 and 139 will cause the voltage from resistor 140 to go low. The voltage input to resistor 140 may be from the 6.8 volt supply line 36 in FIG. 3. When either of the alarm lines 136 or 137 is grounded, an alternative input 141 to the Schmitt trigger 134 goes low. A drop off of either the signal on line 133 or the signal on line 141 activates the Schmitt trigger 134 to provide a high output on line 135, signaling an alarm condition.

The output of Schmitt trigger 134 is connected to the set lead of a C-D flip flop 142. The C and D leads of the flip flop 142 are connected to actual ground at 17. A signal on line 135 to set the flip flop 142 produces a high Q output at 143 and a low $\bar{Q}$ output at 144. When set, the flip flop 142 provides a signal on line 143 which acts as a high input to NOR gates 113, 114 and 115, thereby locking out any and all steering inputs through these NOR gates. Unless set, however, the $\bar{Q}$ output 144 of flip flop 142 is high, thereby disabling the NOR gates 120 and 121 through which signals responsive to alarm conditions are provided to the driving networks 111 and 112.

The positive eight volt supply 34 is connected through a resistor 145 to a mercury switch 146 and then to actual ground 17. The condition of the mercury switch 146 signals the orientation of the collector 10 relative to solar noon. That is, the switch 146 is closed when the collector 10 is tilted at all to the east and open when tilted at all to the west. The purpose of the mercury switch 146 is to allow the motor 19 to be driven in the direction which will carry the collector 10 furthest from an orientation facing the sun when an alarm signal is generated on line 135.

A branch of the alarm signal 135 is connected to the C input of another C-D flip flop 147. Closure of the switch 146 grounds the resistor 145 and causes the D input to flip flop 147 to go low, thereby providing a low Q output on line 148 and high $\bar{Q}$ output on line 149. This condition serves to provide an inhibiting input to gate 120 to prevent the collector 10 from being driven east. Conversely, if the mercury switch 146 is open, the D input to flip flop 147 is high and an inhibiting input to NOR gate 121 is provided, thereby controlling the motor 19 to allow it to only be driven by the eastward driving network 111.

A branch of the alarm circuit 143 is connected to an audio or visual alarm system. A signal on line 143 acts through a resistor 150 to a base of a transistor 151. The collector of transistor 151 is connected through a resistor 152 to the positive eight volt supply 34. The emitter of transistor 151 is connected to a six volt alarm circuit 153 and across a grounded resistor 154 connected to the gate of a traic 155. The triac 155 is connected to a 117 volt external alarm system on line 156. A resistor 157 and capacitor 158 protect the triac from transient voltage fluctuations. In this way a signal on line 143 can be used to provide external alarm signals at 153 and 156 for connection to appropriate alarm devices as desired.

It is desirable for any alarm or overriding signals to be cleared from the tracking control circuit of the invention when power is shut off and later turned on again. Accordingly, a Schmitt trigger is provided at 159 to generate a brief high output when power is turned on. This resets the flip flop 142 and acts as an input to the NOR gate 160 and the inverter 161 to reset the flip flop 117 when power is turned on after having been off. A filter network including a capacitor 162 and a resistor 163 are provided in association with the Schmitt trigger 159. A diode 164 connected in parallel with resistor 165 between the 6.8 volt supply line 36 and the Schmitt trigger 159 is used to discharge the capacitor 162 through the system. Resetting the flip flop 142 removes any pre-existing alarm indications that may have existed at the outputs 143 and 144. Similarly, resetting of the flip flop 117 removes any pre-existing drive signal associated with operation of either the east or west limit switches.

An east limit switch 166 and a west limit switch 167 are provided in the circuit and are normally closed and connected to actual ground 17 to define extreme operating positions of the collector 10 in east and west facing directions respectively. Operation of either of the limit switches 166 or 167 produces signals which dominate any steering signals on lines 58, 103, 104 and 110, but which are in turn dominated by the alarm circuitry previously described. At the end of a solar day, when the collector 10 is turned in a westward facing direction, rotation of the collector 10 to the extreme west facing limit opens the switch 167. This breaks the connection of the 6.8 volt supply 36 through resistor 266 to ground and provides an input to NOR gate 121 and also an input to NOR gate 114. The output of NOR gate 119 thereby goes high, so that no actuating signal is provided to the westward driving network 112. Also, closure of the switch 167 provides an input to the C lead of the flip flop 117, thus driving the $\overline{Q}$ output on line 116 low. This produces a high output from the NOR gate 115 and consequently a low input at the output of NOR gate 118 to serve as an actuating signal to operate the eastward driving network 111. The motor 19 is driven by the eastward driving network 111 until the extreme eastward facing position of the collector 10 is reached. At this point, east limit switch 166 is opened and voltage is provided by the 6.8 volt supply 36 through resistor 168 thereby resetting flip flop 117 through the NOR gate 160 and inverter 161. Concurrently an inhibiting output is provided to the NOR gates 113 and 120 to remove the driving input at the output of NOR gate 118 from eastward driving network 111.

The eastward and westward driving networks 111 and 112 are operated in the same fashion, so that for the sake of simplicity the details of only the eastward driving network 111 have been depicted. A low output from NOR gate 118 serves as a drive signal on line 169 through a resistor 170 and a diode 171 to the base of a transistor 172. A low condition at the base of transistor 172 breaks the connection therethrough from the eight volt supply 34 through resistor 173 to ground. This raises the potential applied to the base of transistor 174, thereby causing a flow of collector-emitter current from the eight volt supply 34 through a resistor 175 to the gate of a triac 176. Gating of the triac 176 allows current to be conducted from a 120 volt alternating current supply line 177, through the coil 20 of motor 19 and through the triac 176 to actual ground 17. A resistor 178 and a capacitor 179 protect the triac 176 against transients, while a resistor 180 and a capacitor 181 protect against back electromotive force. A feedback circuit from the triac on line 182 is provided to a drive circuit network. The signal on line 182 acts through a voltage divider having resistors 183 and 184 to provide a driving signal at a voltage tap 185. Transistors 186, 187, 188 and 189 are interconnected to form a full wave rectifying circuit. The driving signal on line 185 thereby connects the positive eight volt supply on line 34 through a resistor 190 to ground. This ensures removal of an input to diode 191 thus continuing the actuation of the transistor 172. The circuit thereby sustains gating of the triac 176 despite removal of the signal from line 169 until an inhibiting input appears at the output of NOR gate 118. The response of westward driving circuit 112 to signals from NOR gate 119 is identical to provide voltage to coil 18 of the motor 19.

In the normal operation of the control system according to the invention throughout the course of a solar day, the west facing photodetector 12 will from time to time generate a signal larger than that of that east facing photodetector 13. This difference will be amplified and divided by the sum of the outputs of the two photodectors to generate an error signal of positive polarity on line 15. This signal, when it reaches a predetermined magnitude as determined by the setting of the tolerance level adjustment rheostat and shunt mechanism 14, will activate the amplifier 85 to set the flip flop 102, thereby removing the inhibiting signal on line 103. If the sum of the outputs of the photodetectors 12 and 13 is of a sufficient magnitude an inhibiting signal will also be removed from the line 58 at the output of operational amplifier 48. In the absence of any alarm condition which would provide an inhibiting signal on line 143 in FIG. 2B, NOR gate 114 will be activated to provide a high output. This output is transmitted to NOR gate 119 which in response thereto provides a low input to the westward driving network 112. As previously explained a low input to either of the drive units 111 or 112 causes actuation of the associated triac driving circuitry. Thus, in the case of a signal to west driving unit 112, current is conducted through the coil 18 of the motor 19 to drive the collector 10 toward a west facing position. Rotation in this direction will continue until the output of operational amplifier 86 in FIG. 2A responds to the tolerance level adjustment setting of rheostat and shunt mechanism 14 to reset the flip flop 102, thus reinstating the inhibiting output on line 103. The appearance of this inhibiting output removes the driving input to the westward driving network 112 from the NOR gate 119.

Overshooting in resetting the orientation of the collector 10 is detected by the operational amplifier 87. If overshooting does occur, the inhibiting output on line 104 is removed so that an output will appear from NOR gate 113. This in turn produces a low output from NOR gate 118 to reverse the direction of the rotation of motor 19 until reappearance of the inhibiting signal on line 104, as determined by the value of resistor 101.

The normal reorientation signals of the system are superceded by operation of either of the limit switches 166 or 167. At the end of the solar day, acutation of the switch 167 will remove the inhibiting output from line 116 to NOR gate 115. Once the ambient light is sufficiently dim, an inhibiting signal will appear on line 58 from amplifier 48 but will be inverted to remove the inhibiting input to NOR gate 115 on line 110. An output from NOR gate 115 in turn enables the NOR gate 118 to provide a low or driving output to the eastward driving network 111. Thus, current appears through the coil 20 of motor 19 to drive the motor to reorient the collector 10 to an east facing position. Once the collector 10 arrives in the extreme eastward facing position, the limit switch 166 is opened which causes the flip flop 117 to be reset and the inhibiting signal to reappear on line 116.

The system is then returned to the control of the normal tolerance adjusting signals that are derived on lines 103 and 104.

If an alarm condition exists, such as an excessively large temperature as signaled by the thermistor 122, the output of the Schmitt trigger 134 in FIG. 2B will set the flip flop 142 to generate an alarm signal on line 143 which locks out inputs through NOR gates 113, 114 and 115. Instead, an inhibiting signal on line 144 is removed from the NOR gates 120 and 121. A single one of these gates is activated in response to the condition of the mercury switch 146 to produce a driving output from either the NOR gate 118 or 119 to rotate the collector 10 in the direction furthest from the orientation of the sun. The removal of power from the system discharges the capacitor 162 into the system, thereby resetting flip flops 142 and 117 to remove any pre-existing alarm or limit indications.

It is to be understood that while the particular embodiment of the invention depicted is contemplated as being the preferred manner of construction of the invention, various other configurations and modifications will undoubtedly become readily apparent to those familiar with the art. Accordingly, the present invention should not be limited to the particular circuit and component configuration depicted herein, but rather is defined in the claims appended hereto.

I claim:
1. A tracking system for orienting a solar energy collector toward the sun comprising:
   unshielded photosensitive means exposed to direct solar radiation for detecting misalignment of a solar energy collector relative to the sun beyond a preselected limit of tolerance and for generating output signals from each of said photosensitive means,
   means for providing an error signal proportional to the ratio of the difference between the output signals of said photosensitive means to the sum of the output signals of said photosensitive means,
   means responsive to said error signal to realign said collector relative to the sun to a position in advance of the normal orientation of the collector relative to incident radiation to anticipate solar movement, whereby said means responsive to said error signal remains inactive for the duration of an interval during which the sun undergoes relative movement with respect to said collector from a position trailing the orientation of said collector to a position leading the orientation of said collector, and
   means for altering said preselected limit of tolerances uniformly relative to a plane perpendicular to said collector.

2. Apparatus according to claim 1 wherein said means for adjusting can be manipulated to adjust said limit of tolerance from about one half to about thirty angular degrees.

3. Apparatus according to claim 1 further characterized in that said photosensitive means comprises a pair of light sensitive elements each positioned for greater responsiveness to light impinging from opposite directions upon said collector.

4. Apparatus according to claim 3 further comprising threshold enabling means connected to gate said signal only when said outputs exceed a predetermined threshold level, thereby establishing a minimum ambient light level requirement for the surrounding environment for the provision of said signal.

5. Apparatus according to claim 1 further comprising east and west limit switches respectively defining extreme operating positions of said collector in east and west facing directions, and further comprising means operable when said collector trips said west limit switch to rotate said collector to an east facing direction at an orientation determined by said east limit switch.

6. Apparatus according to claim 1 further comprising overshoot detection means sensitive to movement of said collector in a direction to compensate for said misalignment beyond a position of realignment,
   and correction means responsive to said overshoot detection means for reversing the direction of movement of said collector for fine adjustment to said position of realignment.

7. Apparatus according to claim 1 further comprising motion damping means connected to said solar energy collector to dampen movement thereof relative to the surface of the earth, thereby inhibiting the spurious generation of said signal.

8. In a tracking system according to claim 1, the improvement comprising temperature sensing means located on said collector for ascertaining the operating temperature thereof and for providing a temperature signal which, upon reaching a maximum allowable limit, directs said collector to a position facing away from the sun.

9. The tracking system of claim 8 further characterized in that said collector employs a circulating fluid which flows therein to collect and transfer solar energy, and said temperature signal is responsive to the operating temperature of said fluid.

10. The tracking system of claim 9 further characterized in that said maximum allowable limit is adjustable.

11. The tracking system of claim 10 further characterized in that said maximum allowable limit is set in excess of 450° F.

12. A self-contained tracking system according to claim 1 for rotating a solar energy collector to face the sun by means of an electrically operated drive system in which no external electrical power source in provided.

13. A tracking system according to claim 1 further comprising photovoltaic cells mounted on said collector and connected to said electrically operated drive system to provide power thereto.

14. A tracking system according to claim 13 further characterized in that said photovoltaic cells are mounted about the periphery of a solar energy receiving surface of said collector.

15. A self-contained tracking system according to claim 1, the improvement comprising photovoltaic cells mounted thereon to convert sunlight directly to electricity for use in powering operation of said tracking system.

* * * * *